US005766739A

United States Patent [19]

Funaki et al.

[11] Patent Number: 5,766,739

[45] Date of Patent: Jun. 16, 1998

[54] PANEL COMPOSED OF SYNTHETIC RESINS AND COATED WITH AN ANTIFOGGING LAYER AND A METHOD OF MAKING THE PANEL

[75] Inventors: Masaaki Funaki, Ichiharashi; Hiroyoshi Nanri, Kanumashi, both of Japan

[73] Assignees: Nippon Arc Co., Ltd., Chiba; Tsutsunaka Plastic Industry Co., Ltd.; Nippin Sheet Glass Co., Ltd., both of Osaka, all of Japan

[21] Appl. No.: 502,424

[22] Filed: Jul. 13, 1995

[51] Int. Cl.$^6$ .................... B32B 3/10; H05B 3/84

[52] U.S. Cl. .................... 428/201; 428/203; 428/204; 428/323; 428/328; 428/447; 428/451; 428/480; 428/522; 252/500; 252/512; 219/203; 52/171.2; 427/163.1; 427/258; 427/379; 427/380; 427/387; 427/393.5; 427/412.1

[58] Field of Search .................... 428/201, 203, 428/204, 323, 328, 447, 451, 480, 522; 252/70, 500, 511, 512, 518; 219/203; 52/171.2; 106/13; 523/169; 427/163.1, 164, 258, 372.2, 379, 380, 387, 393.5, 412.1

[56] References Cited

U.S. PATENT DOCUMENTS

| | | | |
|---|---|---|---|
| 3,636,311 | 1/1972 | Steger | 219/522 |
| 3,947,278 | 3/1976 | Youtsey | 106/26 |
| 4,387,115 | 6/1983 | Kitamura et al. | 427/58 |
| 4,395,463 | 7/1983 | Kray | 428/447 |
| 5,209,873 | 5/1993 | Yamamoto et al. | 252/512 |
| 5,354,966 | 10/1994 | Sperbeck | 219/203 |
| 5,504,133 | 4/1996 | Murouchi et al. | 524/430 |

*Primary Examiner*—Marie R. Yamnitzky
*Attorney, Agent, or Firm*—Armstrong, Westerman, Hattori, McLeland & Naughton

[57] ABSTRACT

A panel is composed of synthetic resins and coated with an antifogging layer, the panel having a plastics substrate formed as a board or film or molded into any desired shape. The panel further has a heat generating pattern as the antifogging layer formed on the substrate and composed of a conductive paste, and a hard coat covering the layer and mainly composed of a silicone resin. The conductive paste is composed of a resinous binder, a conductive agent and a solvent, and the binder is selected from a group consisting of (i) a saturated polyester, (ii) a mixture of the polyester and a polyvinyl chloride, (iii) a mixture of the polyester and a copolymer of vinyl chloride and vinyl acetate, and (iv) a mixture of the polyester, the polyvinyl chloride and the copolymer. The heat generating pattern layer protects the resin panel from fogging, and the hard coat enhances scratch resistance and weather resistance to the panel.

5 Claims, 1 Drawing Sheet

PANEL COMPOSED OF SYNTHETIC RESINS AND COATED WITH AN ANTIFOGGING LAYER AND A METHOD OF MAKING THE PANEL

BACKGROUND OF THE INVENTION

1. Field of the Invention

The present invention relates to a panel composed of synthetic resins and coated with an antifogging layer, and more particularly to a panel composed of synthetic resins, preferably transparent and having formed thereon a heat generating pattern layer which in turn is covered with a hard coat so as to be usable as an automobile window or the like, and a method of making the antifogging panel.

2. Prior Art

Many proposals have been made to substitute plastics boards for the classical glass windows, so as to render the automobile bodies lighter in weight. However, the problem of an atmospheric vapor condensing to fog the windows and to lower the visibility thereof has been reported, whether the windows are made of glass or plastics. The plastics windows should be covered with hard coats for a better resistance to scratch and weather. On the other hand, protection of the plastics windows from fogging up has been tried by:

(i) blending a surfactant with the plastics before being molded into windows;

(ii) coating the plastics windows with a hydrophilic polymer possibly blended with a surfactant; and/or (iii) laminating the plastics windows with a surfactant-containing film.

The antifogging property of new-fabricated plastics windows of those types is somewhat improved, though this property will fade away before long in the course of time. Besides, their scratch resistance and weather resistance are sometimes not enough to ensure an excellent durability.

In more detail, the windows made by the method (i) above, the surfactant is not concentrated in their surface layers so that their antifogging property is not necessarily satisfactory. The surface layers are soft because they are integral with plastics cores or bodies of the windows. Their resistance to scratch and weather is therefore considerably poor, thus failing to provide an excellent durability.

The hydrophilic polymer coating of the windows made by the further method (ii) absorbs moisture and become softer and less resistant to scratching. They will repeatedly absorb and desorb moisture to thereby impair their weather resistance. Further, the surfactant will be lost during a continued use, thus rendering the antifogging property.

The film bonded to the windows made by the still further method (iii) cannot be resistant to scratching and weathering, also fails to provide a satisfactory durability.

The most preferable way of resolving these problems may be the application of an electrically conductive paste to the plastics windows and subsequently baking the paste to form an appropriate pattern, before covering the whole surface of each window with a hard coat. The pattern consisting of lines or bands should be designed such that it has an electric resistance sufficient to generate the heat required to protect the windows from fogging. The thickness, width and length of each line or band included in said pattern, as well as the number of the lines or bands, are designed to meet this requirement.

However, any optimal combination of such a conductive paste with the most preferable hard coat has not been established yet. In this regard, it is noted that the paste must not only be adhesive to the substrate or plastics windows and resistant to heat and weather, but also must be of a low electric resistance for emitting enough heat to prevent the fogging. The hard coat covering the windows together with the paste pattern baked thereon to improve their wear resistance must not only be adhesive to them and be resistant to weathering, but also must not cause any erosion, elution or whitening of the baked paste. Furthermore, any practically feasible method of forming the hard coat covering each window with the paste pattern baked thereon has also not been established yet.

OBJECTS AND SUMMARY OF THE INVENTION

A first object of the present invention is therefore to provide an antifogging panel that is composed of synthetic resins such that not only its antifogging property endures for a long time, but also its resistance to scratching and weathering meets the requirements indispensable in the nature of things.

A second object of the present invention is to provide a method of making an antifogging panel composed of synthetic resins wherein an electrically conductive paste applied to a substrate is not only protected from elution into a hard coat but also from foliation away from the substrate, when the coat is applied to the conductive paste and the substrate.

To achieve the first object, a panel composed of synthetic resins, coated with an antifogging layer and provided herein comprises: a plastics substrate formed as a board or a film or molded into any desired shape; a heat generating pattern layer as the antifogging layer formed on the substrate and composed of an electrically conductive paste; and a hard coat formed of a silicone-based composition whose main component is a silicone resin to cover the heat generating pattern layer. The electrically conductive paste is composed of a resinous binder, a conductive agent and a solvent, wherein the resinous binder is selected from a group consisting of (i) a saturated polyester, (ii) a mixture of a saturated polyester and a polyvinyl chloride, (iii) a mixture of a saturated polyester and a copolymer of vinyl chloride and vinyl acetate, and (iv) a mixture of a saturated polyester, a polyvinyl chloride and a copolymer of vinyl chloride and vinyl acetate.

The heat generating pattern layer or print, which may be surrounded by a colored or translucent area if so desired, may consist of a pair of electrode portions and a plurality of heat generating lines or bands extending between the electrode portions.

To achieve the second object, a method of making a panel composed of synthetic resins and coated with an antifogging layer comprises herein the steps of: preparing a plastics substrate formed as a board or a film or molded into any desired shape; then applying an electrically conductive paste to the plastics substrate; next, curing the paste to form thereon a heat generating pattern layer as the antifogging layer; subsequently applying to the heat generating pattern layer a silicone-based composition whose main component is a silicone resin; and finally curing the silicone-based composition to form a hard coat covering the heat generating pattern layer, wherein the electrically conductive paste is composed of a resinous binder, a conductive agent and a solvent, with the resinous binder being selected from a group consisting of (i) a saturated polyester, (ii) a mixture of a saturated polyester and a polyvinyl chloride, (iii) a mixture of a saturated polyester and a copolymer of vinyl chloride and vinyl acetate, and (iv) a mixture of a saturated polyester, a polyvinyl chloride and a copolymer of vinyl chloride and vinyl acetate.

The silicone-based composition for forming the hard coat proposed herein preferably may be an organopolysiloxane that essentially consists of a condensation oligomer of $RSi(OH)_3$ and an aqueous or alcoholic dispersion of colloidal silica or any colloidal metal oxide, wherein 'R' is: alkyl group having one to three carbon atoms; vinyl group; 3,3,3-trifluoropropyl; γ-aminopropyl; γ-methacryloxypropyl; or γ-glycidoxypropyl, and wherein the dispersion is diffused throughout the condensation oligomer.

DETAILED DESCRIPTION OF THE INVENTION

Figure 1:
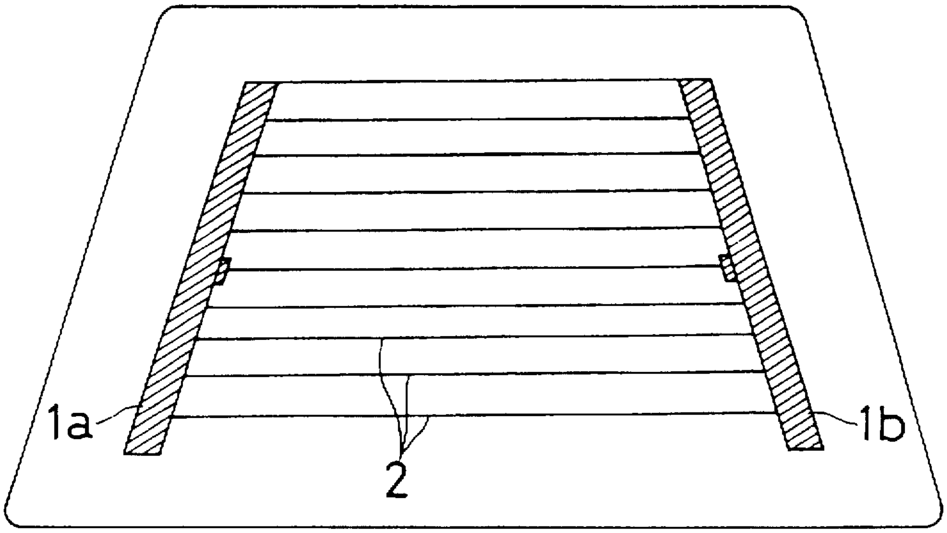
FIG. 1 illustrates a pattern consisting of electrode portions and heat generating lines extending therebetween, with the portions and lines being made from a conductive paste and formed on a molded plastics article, in an embodiment of the present invention.

The composition of the antifogging layer and the relevant features will now be described in more detail.

1. Composition of Conductive Paste to Afford the Antifogging Property (1) Resinous binder The most preferable one of the binders is a polyester resin, though an acrylic resin, an epoxy resin and a phenolic resin are also available. This is because (a) a silver powder and/or copper powder can readily and uniformly be diffused in the polyester to render the lowest electric resistance of the paste, (b) the polyester resin is of a good stickability to a polycarbonate or acrylic resin substrate, and (c) is highly resistant to heat, (d) to weather, and (e) to solvents.

The polyester-based resin as the binder may preferably be a saturated polyester composed of a mixture of dibasic acids and a glycol such as polyethylene glycol or polypropylene glycol having been reacted with the acid mixture to form ester groups. The acid mixture comprises an aromatic carboxylic acid such as phthalic acid or trimellitic acid, to which an aliphatic acid such as succinic acid is added to enhance flexibility of the polyester-based resin. The molecular weight of the saturated polyester is 5,000–40,000, and more preferably 10,000–30,000. An excessively low molecular weight will render the resin less resistant to heat and solvents. An excessively high molecular weight will make it difficult to diffuse the silver or copper powder in the resin.

The saturated polyester may either be used alone or in combination with polyvinyl chloride and/or copolymer of vinyl chloride and vinyl acetate. A content of the polyvinyl chloride and/or the copolymer in the polyester-based resin may be 0–40% by weight.

0–20% by weight of a cross-linking agent such as an ordinary or blocked isocyanate compound may be contained in the saturated polyester used alone to provide the polyester-based resin. Residual —OH groups which are present in the polycondensate of dibasic acid and glycol will react with the isocyanate compound. Whether the hard coat is formed directly on or a certain primer coat is previously formed on the conductive pattern layer, the polyester-based resin sometimes has to be resistant to an ether or alcohol as the solvent of a considerably high boiling temperature.

Useful and effective to meet this requirement are the blending of polyvinyl chloride and/or copolymer of vinyl chloride and vinyl acetate as well as the blending of ordinary or block isocyanate compound with polyester resin.

(2) Conductive agent

A metal powder such as silver powder is used as the electrically conductive agent. Particles of the powder may preferably be coated with a high (long-chained) fatty acid such as stearic acid (serving as a lubricant for) enhancing dispersibility of said powder. Each particle may be a fine flake having a diameter of 1–30 μm and 3–5 μm thick. In addition to silver powder, copper powder or zinc powder can be used as the electrically conductive agent.

(3) Solvent

Although any solvent may be used insofar the polyester-based resin can readily be dissolved and the printability of the paste is not affected adversely, certain high boiling solvents such as butyl cellosolve acetate, ethyl cellosolve acetate and the like are preferred.

35–75% by weight, more preferably 50–70% by weight of the solid ingredients [i.e., (1) the resinous binder plus (2) the conductive agent] may be contained in the paste. An excessively low content of the solid ingredients will be insufficient to ensure a low electric resistance, while an excessively high content will make it difficult for the metal powder to be diffused uniformly in the paste.

2. Thickness of Conductive Paste and Optimal Conditions of Curing Same

Joule heat of about 200–800 $W/m^2$ is necessary to protect the synthetic resin panel from fogging. In an example of plastics window as shown in FIG. 1, the electric resistance between electrode portions 1a and 1b will be adjusted to meet this requirement. In detail, the thickness, width, length and number of the heat generating lines 2 extending between said electrode portions will be designed to be appropriate. As for the thickness, it is preferably 5–30 μm, and more preferably 10– 20 μm.

A thickness of 5 μm or less of said portions 1a and 1b and said lines 2 will be insufficient to ensure a desirable electric resistance. However, an excessive thickness of 30 μm or more will cause the flexibility of the coating of conductive pattern including the heat generating lines 2 to be poor. Small cracks will be produced in such thick lines, and edges of each line 2 will not be covered evenly with the hard coat which will subsequently applied to the conductive pattern to cover same.

The conductive paste has to be cured at a temperature within a range of about 80° to 130° C. to diminish residual amount of solvent. A lower or higher temperature within this range will need a longer or shorter time for the curing, respectively. A proper length of the curing process is from 20 min to 3 hours. An insufficiently cured pattern layer will cause the resinous binder to be eluted or fail to realize a sufficiently low electric resistance.

3. Silicone-Based Hard Coat

The hard coat need not be composed of any special material, but may preferably be composed of a typical silicone compound. This compound is an oligomer, viz. a condensation product represented by formula: $RSi(OH)_3$ wherein 'R' is selected from a group consisting of: alkyl group having one to three carbon atoms; vinyl group; 3,3,3-trifluoropropyl; γ-amino-propyl; γ-methacryloxypropyl; or γ-glycidoxypropyl. The most preferable groups are methyl group and γ-glycidoxypropyl group. The silicone compound will be blended with an aqueous or alcoholic dispersion of colloidal silica or any other colloidal metal oxide.

If the resin substrate is formed of a polycarbonate, a heat-resistant acrylic resin or the like, it is recommended that a primer sticking well to both the substrate and the hard coat be applied thereto. Preferable examples of such a primer are of the so-called acrylic solvent type. The primer of this type is composed of an acrylic homopolymer or a copolymer of acrylic monomer and any other suitable monomer, and may contain a cross linking agent and an ultraviolet stabilizer, if so desired.

If the synthetic resin panel is a window and any terminals or leads connected to the electrode portions (1*a*, 1*b*) included in the heat generating pattern layer have to be invisible, then said layer may be surrounded by (viz. masked with) a colored or translucent area. Usually, a masking ink will be printed to a marginal fringe of the window, prior to application of the conductive paste.

The synthetic resin panel, to which the heat generating pattern layer of conductive paste and the silicone-based hard coat covering same are applicable in the present invention, does include a plastics board, a plastics film and a molded plastics article. Examples of them are: an automobile window; a spy glass of refrigerator or the like; and a lighting window in a zone of cold.

If the resin panel is the automobile window, the pattern layer and hard coat may be applied to an inner face of the window so as to be more durable.

The panel body made of polycarbonate, acrylic or the like resin can now be printed with the conductive paste, directly by the screen printing, whether the panel body is a board, a film or a molded article. The printed paste forming a heat generating pattern having an electric resistance to emit a heat for protection of said panel body from fogging is cured before coated with the hard coat. The hard coat enhances the scratch resistance and weather resistance of the panel inclusive of the printed and cured conductive paste.

The conductive pattern layer composed of a saturated polyester resin is not only resistant to weather and well sticking to the panel body but is also free from erosion by or elution into the hard coat formed in contact with said layer. Thus, an ideal combination of the antifogging property of the optimally designed conductive pattern with the excellent scratch resistance and weather resistance of the hard coat firmly adhering to said pattern is realized in the resin panel provided herein.

Similarly to ordinary inorganic glasses, the resin panel looks fine externally since the hard coat can be applied smoothly and evenly to the whole surface of said panel including the printed heat generating lines.

THE PREFERRED EMBODIMENTS

Now some embodiments will be described referring to Examples.

EXAMPLE 1

Undercoating Paint for Primer 320 g of propyleneglycol monomethyl ether was kept at 90° C. in nitrogen gas, and a mixture of 90 g of methyl methacrylate, 10 g of γ-methacryloxypropyl trimethoxy silane and 0.8 g of azobisbutyronitrile was added to the ether within 2 hours. Subsequently, the system was maintained at 90° C. for 5 hours, before 760 g of methyl cellosolve, 5 g of 10%-aqueous solution of di-n-butylamine, 1.1 g of diethyleneglycol and 20 g of 2-(2'-hydroxy-5'-t-butyl phenyl) benzotriazole were added. An undercoating paint 'A' thus prepared was for use to form the primer mentioned above.

Final Coating Paint for Hard Coat 135 g of colloidal silica, 110 g of colloidal antimony oxide, 207 g of methyl trimethoxysilane and 7.0 g of acetic acid were mixed with each other and stirred at 50° C. for 3 hours for hydrolysis of the silane compound. The colloidal silica was a product 'Snowtex O-40' of Nissan Kagaku Kogyo Co., Ltd., which was of the aqueous dispersion type and whose solid content was 40%. The colloidal antimony oxide was a product 'Antimony-Oxide-Sol 1510P' of Nissan Kagaku Kogyo Co., Ltd., which was of the aqueous dispersion type and whose solid content was 12%. Subsequently, 195 g of n-butanol, 195 g of isopropyl alcohol, 1.26 g of sodium acetate and 11.0 g of acetic acid were added to the mixture so as to prepare a final coating paint 'A' for forming the hard coat.

Plastics Board as Substrate of Automobile Vehicle's Window

A previously washed polycarbonate sheet (a product 'Polyca-ace' of Tsutsunaka Plastic Industry Co., Ltd.) was used as the substrate board. A conductive paste 'A' (a product 'Dotite FA-323' of Fujikura Kasei Co., Ltd.) was screen printed on the polycarbonate sheet. This paste contained a saturated polyester resin and a block type isocyanate compound as a cross linking agent, and was of a specific resistance of $3.5\times10^{-5}$ Ωcm. The printed pattern comprised a plurality of parallel heat generating lines each 1.0 mm wide and arranged at regular intervals of 15 mm. A pair of electrode portions each 20 mm wide were also printed to be adjoined to respective ends of those heat generating lines. Thereafter, the paste was cured at 120° C. for 45 minutes to provide a solidified conductive pattern.

The polycarbonate board having the conductive pattern formed thereon was then heated to and kept at 180° C. for 10 minutes, before hot pressed into a shape of automobile window 'A'.

The raw automobile window 'A' was subsequently immersed in a bath of the undercoating paint 'A' (according to the 'dip coat method'), taken out of the bath and hot dried in a hot-air blasting oven at 120° C. for 30 minutes. The printed pattern of heat generating lines were neither eluted nor eroded by the undercoating paint 'A', thus providing an unfinished window with a clear surface.

Next, the unfinished automobile window 'A' was dipped in another bath of the final coating paint 'A', taken out of the bath and hot dried in a hot-air blasting oven at 120° C. for 60 minutes. In this case also, the printed pattern of heat generating lines were neither eluted nor eroded by the final coating paint 'A', thus providing a finished window with a clear surface.

The automobile window 'A' had a transparent and clear surface notwithstanding the presence of heat generating lines printed thereon. Wear resistance of the top hard coat covering the blank and printed zones rated as rank #A, adhesiveness of the coat rated as 100/100, the water resistance thereof proved excellent, and the showed a satisfactory quality after a 'sunshine weather-o-meter test' for 2000 hours, in appearance, hardness and adhesiveness to the substrate. Fog on the window disappeared within 10 minutes (almost 6–7 minutes) after the turning on electricity.

Performance Ratings of Hard Coat

Wear resistance ( viz. Scratch resistance

The hard coat was rubbed with a #0000 steel wool to inspect its resistance to scratching and ranked as:

#A . . . no scratch by a strong rubbing;

#B . . . a few scratches by the strong rubbing; or

#C . . . many scratches by a weak rubbing of the coat.

Adhesiveness (viz. Bond strength)

The 'cross-cut tape test' was conducted wherein 11 (eleven) parallel slits were made by cutting with a knife vertically and horizontally to form 100 squares on the hard coat. An adhesive cellophane (trademark) tape was stuck on the coat and then peeled therefrom so as to count the not removed squares per 100 squares.

Water resisting (viz. Waterproofness)

Whitening, cracking and foliation of the coat were checked after being kept 7 days in a hot water of 60° C.

Accelerated test of weather resistance

A 'sunshine carbon-arc weather-o-meter' was used to evaluate the weather resistance, wherein the 'black panel temperature' was kept at 63°±3° C. and the water spray was repeated intermittently for 12 minutes per hour. A 'xenon-arc weather-o-meter' was also used, wherein the 'black panel temperature' was kept at 63°±3° C. and the water spray was repeated intermittently for 18 minutes per 2 hours. Irradiation intensity was 0.35 $W/m^2$ at a wavelength of 340 nm.

Antifogging property

The plastics windows each having the heat generating pattern and coated with the hard coat were built in an automobile vehicle body and placed in an atmosphere whose outdoor temperature was 0° C. The indoor temperature and humidity inside the cabin or automobile room was 30° C. and 80% RH, respectively. Once the window had become clouded up with vapor, a voltage of 12 V was charged between the electrode portions so as to measure the time necessary for the fog to disappear.

EXAMPLE 2

Final Coating Paint for Hard Coat 80 g of γ-glycidoxypropyl trimethoxysilane, 144 g of methyl trimethoxysilane, 71 g of colloidal silica and 170 g of 0.1N aqueous solution of hydrochloric acid were mixed with each other and stirred at 80° C. for 2 hours for hydrolysis of the silane compounds. The colloidal silica was a product 'Snowtex O' of Nissan Kagaku Kogyo Co., Ltd., which was of the aqueous dispersion type and whose solid content was 20%. Subsequently, 146 g of ethyl cellosolve and 1.3 g of ammonium perchlorate were added to the mixture, which was a solution of a 'terpolymeric' hydrolysis product, so as to prepare a final coating paint 'B' for forming the hard coat.

A previously washed acrylic resin sheet (a product 'Sumipex' of Sumitomo Kagaku Kogyo Co., Ltd.) was used as the substrate board. A conductive paste 'B' (a product 'Dotite FA-517' of Fujikura Kasei Co., Ltd.) was screen printed on the polycarbonate sheet. This paste contained a saturated polyester resin and a copolymer of vinyl chloride and vinyl acetate, and was of a specific resistance of $3.0\times10^{-5}$ Ωcm. The printed pattern comprised a plurality of parallel heat generating lines each 1.5 mm wide and arranged at regular intervals of 20 mm. A pair of electrode portions each 20 mm wide were also printed to be adjoined to respective ends of those heat generating lines. Thereafter, the paste was cured at 90° C. for 2 hours to provide a solidified conductive pattern.

The acrylic resin sheet having the conductive pattern formed thereon was then heated to and kept at 140° C. for 10 minutes, before vacuum molded into a shape of automobile window 'B'.

The undercoating paint 'B' was caused to flow on and along the raw automobile window 'B' (according to the 'flow coat method'), and hot dried in a hot-air blasting oven at 80° C. for 3 hours. The coat portion covering the printed pattern of heat generating lines neither showed any change in appearance nor was whitened by the final coating paint 'B', thus providing a finished window with a clear surface.

The finished automobile window 'B' had a transparent and clear surface notwithstanding the presence of heat generating lines printed thereon. Wear resistance of the top hard coat covering the blank and printed zones rated as rank #A, adhesiveness of the coat rated as 100/100, the water resistance thereof proved excellent, and the showed a satisfactory quality after a 'sunshine weather-o-meter test' for 2000 hours, in appearance, hardness and adhesiveness to the substrate. Fog on the window disappeared within 10 minutes (almost 5–6 minutes) after the turning on electricity.

EXAMPLE 3 AND REFERENCES 1 & 2

A previously washed polycarbonate film (a product 'Polyca-ace' made by Tsutsunaka Plastic Industry Co., Ltd. above and 0.5 mm thick) was used as the substrate. A black masking ink composed of an acrylic resin was screen printed on selected zones of the substrate and cured at 120° C. for 10 minutes. Thus, colored translucent zones of 40 mm wide were formed along the fringe of an automobile rear window. Next, the conductive paste 'A' was applied to the substrate to provide the pattern of heat generating lines, in a manner similar to that in Example 1. The pattern was then cured at 120° C. for 45 minutes. As the Reference 1 listed in Table 1, the saturated polyester resin as the binder in the conductive paste was replaced with a phenolic resin or an epoxy resin. The patterns in References were then cured also at 120° C. for 45 minutes.

TABLE 1

| | Resin as binder | Resistance to water | Resistance to weather | Anti-fogging |
|---|---|---|---|---|
| Exam. 3 | saturated polyester ( Fujikura's Dotite FA-323 ) | no problem | no problem | within 10 min ( almost 6–7 min ) |
| Ref. 1 | phenolic resin ( Three-Bond's Paste 3321 ) | foliation | foliation | 20 min or more |
| Ref. 2 | epoxy resin ( Fujikura's Dotite FA-705 ) | no problem | foliation | 20 min or more |

Notes: 'Exam.' = Example, 'Ref.' = Reference, 'Antifogging' denotes a time by when fog disappeared.

Each film having the patterns of heat generating lines composed of the different conductive pastes and surrounded by the masking zones was then cut into a shape of window. Each cut piece of film was placed in an injection mold into which a heat resistant acrylic resin (a product 'KAMAX T-240' made by the Rohm and Haas Co., Ltd.) was injected. Windows 'C' were made in this manner by the so-called 'film insert molding' method'.

Subsequently, the undercoating paint 'A' was applied to those windows 'C' by immersing them in a bath of the undercoating paint 'A' (by 'dip coat method'), taken out of the bath and hot dried in the hot-air blasting oven at 120° C. for 60 minutes.

Next, the unfinished automobile windows 'C' composed of heat resistant acrylic resin with the polycarbonate film inserted therein were dipped in another bath of the final coating paint 'A', taken out of the bath and hot dried in the hot-air blasting oven at 120° C. for 60 minutes, thus providing finished windows 'C'.

The automobile window 'C' having the masking zone and the conductive pattern of paste 'A' had a transparent and clear surface notwithstanding the presence of heat generating lines printed thereon. Wear resistance of the surface layer covering the pattern and zones rated as rank #A, adhesiveness of the coat rated as 100/100, the water resistance thereof proved excellent, and a satisfactory quality is shown in appearance, hardness and adhesiveness to the substrate after a 'sunshine weather-o-meter test' for 2000 hours. Fog on the window disappeared within 10 minutes (almost 6–7 minutes) after the turning on electricity. However, those windows 'C' having the conductive patterns made of the reference pastes caused foliation of said patterns, and necessitated a time of 20 minutes or longer for the fog to disappear, thereby proving poor in antifogging property.

EXAMPLE 4 AND REFERENCE 3 & 4

Undercoating Paint for Primer

A blend of 400 g of propyleneglycol monomethyl ether, 170 g of methyl methacrylate and 30 g of 2-hydroxyethyl methacrylate was kept at 80° C. in nitrogen gas, and a solution of 1.0 g of azobisbutyronitrile dissolved in 200 g of propyleneglycol monomethyl ether was added to the blend within 2 hours. This system was kept at that temperature further for 5 hours. Thereafter, 400 g of propyleneglycol monomethyl ether and 21 g of 2-(2'-hydroxy-5'-octyl phenyl) benzotriazole were added to the system. An undercoating paint 'B' thus prepared was for use to form the primer mentioned above.

Final Coating Paint for Hard Coat 150 g of colloidal silica was blended with 35 g of colloidal antimony oxide to prepare a mixture. The colloidal silica was a product 'Snowtex O-40' of Nissan Kagaku Kogyo Co., Ltd., which was of the aqueous dispersion type and whose solid content was 40%. The colloidal antimony oxide was a product 'Suncolloid AMT-130S' of Nissan Kagaku Kogyo Co., Ltd., of the alcoholic dispersion type and whose solid content was 30%. The above mixture was mixed with 220 g of methyl trimethoxysilane and 10 g of acetic acid and stirred at 55° C. for 2 hours for hydrolysis of silane compound. Subsequently, 250 g of isopropyl alcohol, 200 g of n-butanol, 1.3 g of sodium acetate and 11 g of acetic acid were added to the mixture so as to prepare a final coating paint 'C' for forming the hard coat.

Window with Heat Generating Lines

Raw windows 'D' were injection molded using a heat resistant acrylic resin (a product 'Delmore H350A' of Asahi Kasei Co., Ltd.). A conductive paste 'C' (a product 'Dotite FA-333' of Fujikura Kasei Co., Ltd. ) was screen printed on the raw windows. This paste contained a saturated polyester resin alone as the binder resin, and was of a specific resistance of $3.0\times10^{-5}$ Ωcm. The printed pattern comprised a plurality of parallel heat generating lines each 1.0 mm wide and arranged at regular intervals of 15 mm. A pair of electrode portions each 20 mm wide were also printed to be adjoined to respective ends of those heat generating lines. Thereafter, the paste was cured at 120° C. for 60 minutes to provide a solidified conductive pattern.

As References 3 and 4, the same conductive paste 'C' was applied to the raw windows but cured at temperatures and for periods both different from those in Example 4.

The raw automobile windows 'D' were subsequently immersed in a bath of the undercoating paint 'C' (according to the 'dip coat method'), taken out of the bath and hot dried for 30 minutes. Next, the unfinished automobile window 'D' were further dipped in another bath of the final coating paint 'C', taken out of the bath and hot dried at 110° C. for 60 minutes.

As seen in Table 2, a low temperature and/or a short time in drying the coatings resulted in an incomplete curing, whereby the conductive paste was eluted to whiten the hard coat, or eroded by the solvent in the paste, causing a defect of defoliation.

TABLE 2

| | Condition of drying | Elution / Erosion | Adhesiveness |
|---|---|---|---|
| Example 4 | 120° C. × 60 min | no defect in appearance | 100/100 |
| Reference 3 | 80° C. × 30 min | elution, whitening | 100/100 |
| Reference 4 | 100° C. × 10 min | erosion, foliation | 0/100 conductive paste fully foliated |

It will now be apparent that the heat generating pattern layer formed on a resin panel and composed of a conductive paste protects the resin panel from fogging, and the silicone-based hard coat entirely covering the resin panel enhances the scratch resistance and weather resistance thereof.

What is claimed is:

1. A panel composed of synthetic resins and coated with a layer, the panel comprising:

a plastics substrate formed as a board or a film or molded into any desired shape;

a heat generating pattern layer as the layer coated on the substrate and formed from an electrically conductive paste; and a coat formed of a silicone-based composition containing a silicone resin which covers the heat generating pattern layer, where the electrically conductive paste is composed of a resinous binder, a conductive agent and a solvent, with the resinous binder being selected from the group consisting of (i) a mixture of a saturated polyester and a polyvinyl chloride, (ii) a mixture of a saturated polyester and a copolymer of vinyl chloride and vinyl acetate, and (iii) a mixture of a saturated polyester, a polyvinyl chloride and a copolymer of vinyl chloride and vinyl acetate, where the amount of polyvinyl chloride and/or copolymer of vinyl chloride and vinyl acetate in the resinous binder is up to 40% by weight, and with the resinous binder and the conductive agent being 35–75% by weight of the electrically conductive paste.

2. The panel as defined in claim 1, wherein a periphery of the heat generating pattern layer is surrounded by a colored translucent area.

3. The panel as defined in claim 1, wherein the heat generating pattern comprises a pair of electrode portions and a plurality of heat generating lines extending between the electrode portions.

4. The panel as defined in claim 1, 2 or 3, wherein the silicone-based composition for forming the coat comprises an organopolysiloxane that consists essentially of a condensation oligomer of $RSi(OH)_3$ and an aqueous or alcoholic dispersion of colloidal silica or any colloidal metal oxide, wherein 'R' is selected from the group consisting of an alkyl group having one to three carbon atoms, a vinyl group, 3,3,3-trifluoropropyl, γ-aminopropyl, γ-methacryloxypropyl and γ-glycidoxypropyl.

5. A method of making a panel composed of synthetic resins and coated with a heat generating layer, the method comprising the steps of:

preparing a plastics substrate formed as a board or a film or molded into any desired shape;

then applying an electrically conductive paste to the plastics substrate;

next, curing the paste to form thereon the heat generating pattern layer;

subsequently applying to the heat generating pattern layer a silicone-based composition containing a silicone resin; and finally curing the silicone-base composition to form a coat covering the heat generating pattern layer, wherein the electrically conductive paste is composed of a resinous binder, a conductive agent and a solvent, with the resinous binder being selected from the group consisting of (i) a mixture of a saturated polyester and a polyvinyl chloride, (ii) a mixture of a saturated polyester and a copolymer of vinyl chloride and vinyl acetate, and (iii) a mixture of a saturated polyester, a polyvinyl chloride and a copolymer of vinyl chloride and vinyl acetate, where the amount of polyvinyl chloride and/or copolymer of vinyl chloride and vinyl acetate in the resinous binder is up to 40% by weight, and with the resinous binder and the conductive agent being 35–75% of the electrically conductive paste.

* * * * *